United States Patent [19]
Campbell

[11] 4,170,293
[45] Oct. 9, 1979

[54] ENCLOSED CONVEYOR

[75] Inventor: David R. Campbell, Salt Lake City, Utah

[73] Assignee: Cambelt International Corporation, Salt Lake City, Utah

[21] Appl. No.: 821,477

[22] Filed: Aug. 3, 1977

Related U.S. Application Data

[63] Continuation of Ser. No. 641,089, Dec. 15, 1975, abandoned, which is a continuation-in-part of Ser. No. 449,334, Mar. 8, 1974, abandoned.

[51] Int. Cl.² ............................................. B65G 21/00
[52] U.S. Cl. .......................................... 198/861; 14/70
[58] Field of Search .................... 198/860, 861; 14/70; 193/2 A; 138/105, 108

[56] References Cited

U.S. PATENT DOCUMENTS

| | | | |
|---|---|---|---|
| 338,638 | 3/1880 | Hodges | 198/119 |
| 437,954 | 10/1890 | Werntz | 193/2 A |
| 1,008,432 | 11/1911 | Pearce | 138/108 X |
| 3,215,257 | 11/1965 | Albers | 198/213 X |
| 3,776,253 | 12/1973 | Yamaguchi et al. | 138/108 X |

*Primary Examiner*—Robert B. Reeves
*Assistant Examiner*—Douglas D. Watts
*Attorney, Agent, or Firm*—K. S. Cornaby

[57] ABSTRACT

Prior known enclosed conveyors have had a conventional belt conveyor mounted on a structural framework resting on a series of support columns known in the art as bents. A housing or gallery, as it is known in the art, consisting of a roof, side walls and optionally a floor, is constructed on structural members around the conveyor covered by a protective material. Often times, the housing is large enough to accomodate a walk-way alongside the conveyor. In each instance, however, both the housing and the conveyor are supported by structural members and not by the protective covering material of the housing. There have been instances of short spans of enclosed conveyors using solid longitudinal members as side and top walls as well as for support, but these spans have no internal stabilizing members to prevent undesirable distortion of the conveyor housing.

5 Claims, 5 Drawing Figures

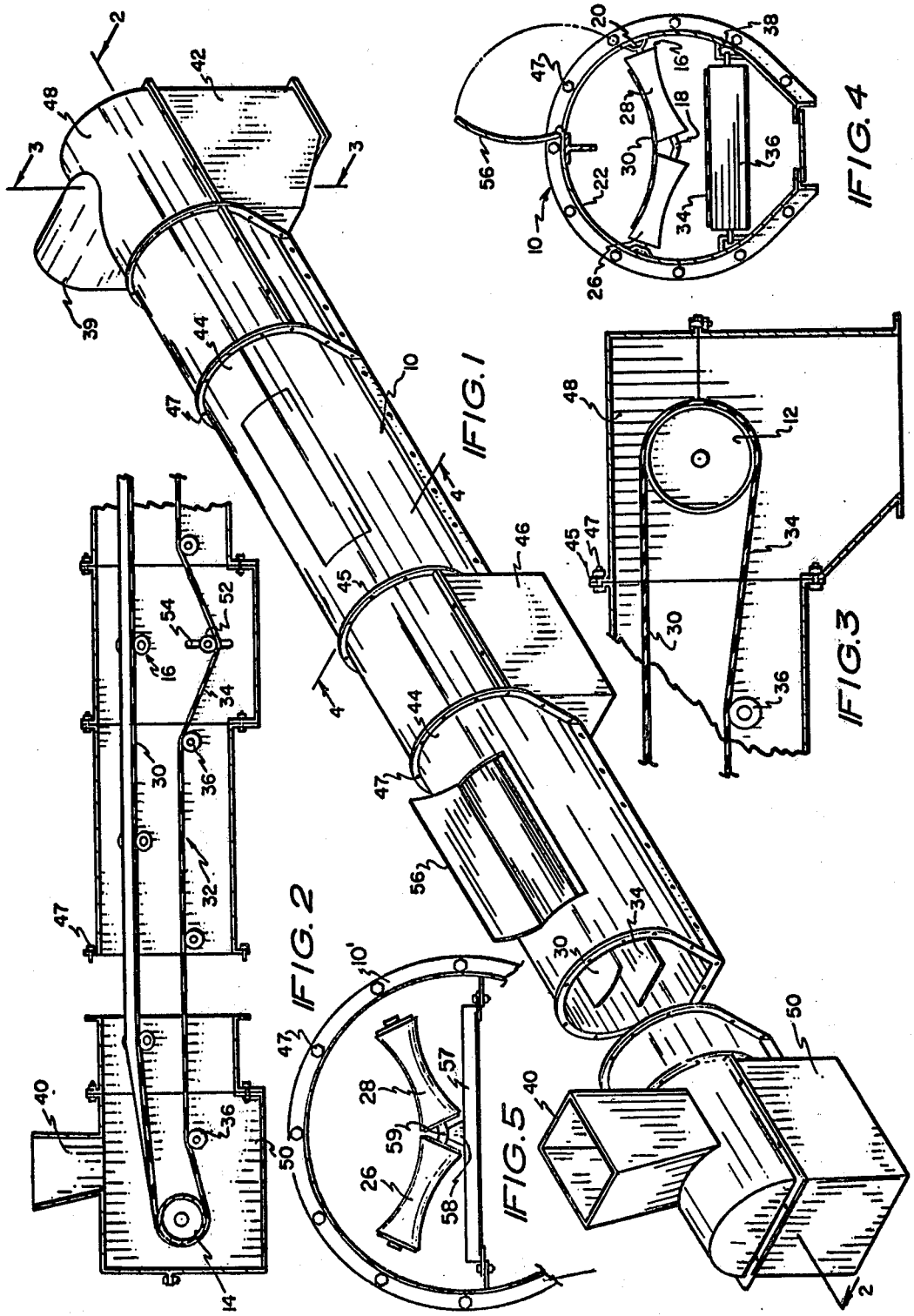

ENCLOSED CONVEYOR

This is a continuation of application Ser. No. 641,089, filed Dec. 15, 1975, now abandoned, which is a continuation-in-part of application Ser. No. 449,334, filed Mar. 8, 1974, now abandoned.

BACKGROUND OF THE INVENTION

1. Field of the Invention

This invention is directed to an enclosed conveyor and particularly to a conveyor wherein troughed belt support idler rollers are suspended within a generally unobstructed elongated tubular housing.

2. State of the Art

In conventional troughed conveyors, an endless conveyor belt is trained about head and tail pulleys mounted at opposite ends of the conveyor. The working run of the belt is supported by idlers centrally mounted on a transverse floor member that divides the housing into upper and lower chambers while the return run is supported on idler rollers located in the lower compartment. In such prior structures, the transverse floor is required for structural strength. However, such floors are difficult to install and their use substantially increases the weight of the conveyor thus increasing its cost and also limiting its use to those instances where the conveyor can be ground-supported at closely spaced intervals. Moreover, the floor is a continuous member running the length of the conveyor thus requiring that the entire conveyor be custom built.

OBJECTS OF THE INVENTION

It is a primary object of this invention to provide an enclosed conveyor of design and construction that permits elimination of a continous floor to support the upper rollers between the upper and lower run of the belt.

Another object is to provide a conveyor adapted to span greater distances between support points while a further object is to provide a unique modular construction for a conveyor adapted to on-the-spot assembly of the conveyor to desired length and configuration.

An additional object is to provide an enclosed conveyor which has long span capability and needs be supported only at great distances utilizing self-supporting fuselage-type construction having circumferential flanges spaced at periodic intervals along the housing skin and internal transverse braces adapted to prevent distortion of the shape of the conveyor and to provide structural integrity.

Still another object is to provide a conveyor structure in which the belt runs in a compartment adapted to be closed for substantially dust-free operation.

SUMMARY OF THE INVENTION

Broadly stated, the conveyor includes a generally tubular housing having a material inlet and discharge and equipped with an endless conveyor belt trained over a head and tail pulley mounted adjacent its opposite ends. Intermediate the pulleys a plurality of idler rollers, preferably troughed, are mounted either from the inner side walls of the housing, or on spaced transverse beams, to support the upper run of the belt. On its return run the belt is supported by a series of idler rollers, usually straight, located adjacent the bottom of the housing. In a preferred embodiment, at least the upper portion of the housing is rounded, as a partial cylinder, for reducing wind resistance and the area upon which snow or dirt may accumulate. Spaced circumferential flange means encircle the housing to provide, with the transverse beams, structural integrity and provide for long spans of unsupported conveyor which can be assembled in the field.

BRIEF DESCRIPTION OF THE DRAWINGS

The preferred mode for carrying out the invention is shown in the accompanying drawing, in which:

FIG. 1 is an isometric view showing generally a conveyor constructed according to this invention;

FIG. 2 is a sectional view taken in a plane passing through line 2—2 of FIG. 1;

FIG. 3 is a sectional view taken in a plane passing through line 3—3 of FIG. 1;

FIG. 4 is a sectional view taken in a plane passing through line 4—4 of FIG. 1.

FIG. 5 is a view similar to FIG. 4, but illustrating another method of mounting the upper idler rollers.

DESCRIPTION OF THE PREFERRED EMBODIMENT

As illustrated, the conveyor comprises an elongated tubular housing 10 equipped with a head pulley 12 and a tail pulley 14 mounted adjacent its opposite ends. Intermediate the ends, a plurality of transverse longitudinally spaced idlers 16 are mounted. Each of the idlers 16 comprises individual rollers 26 and 28 which are concave and together form a troughed belt support. The rollers 26 and 28 are in pairs and are both mounted for rotation on a shaft 18 extending transversely of the housing. In the embodiment illustrated in FIG. 4 the shaft 18 is supported solely by connection of its outer ends 20 to the housng sidewalls 22; and the shaft is bent in the middle to form a shallow vee for supporting the working run 30 of a conveyor belt 32 that is trained about the head and tail pulleys 12 and 14.

On its return run 34 the belt is supported by a plurality of cylindrical return rollers 36 rotatably mounted on shaft supported in brackets 38 fixed to a lower section of the housing 10. The head pulley is rotatably driven by a suitable motor not shown but which may be enclosed in a housing 39 adjacent the head pulley.

At one end of the housing a feed hopper 40 is provided to receive the material to be transported and direct it onto the moving belt for transport to discharge through an outlet 42 adjacent the other end of the housing.

In a preferred embodiment, the housing 10 is constructed from a series of detachably connected modules 44. Each module is connected at its flanged ends 45 to a like module or to a flanged ground support member 46 such connection being readily effected by bolts 47 or similar fasteners. Generally, each module will have a diameter of between 24 to 60 inches and a length of from five to seventy feet, depending upon the size of the tube, with spans of 50 feet being common. In addition, each module will have mounted therein from two to twelve upper support rollers and from one to five return rollers. The end sections 48 and 50 which contain the head and tail pulleys respectively are constructed to be easily connected to the intermediate modules. An endless conveyor belt of suitable length is then trained around the head and tail pulleys which are adjusted to provide the proper belt alignment. During operation, the belt is automatically maintained under proper tension by one or more gravity-type takeup rollers 52 rotatably mounted on shafts, the ends of which are mounted in slots 54 cut in the wall of the enclosure 10 to permit vertical movement of the shaft and roller. Access doors 56 are provided for maintenance.

In the modification illustrated in FIG. 5 the rollers 26 and 28 are mounted on a shaft 59 that is secured to a pedestal 58 mounted on a small transverse beam 57 spanning the housing. The use of a plurality of small beams as opposed to a floor is significant because the small beams enable construction simply by bolting modules together whereas if a floor is used the floor sections must be precisely aligned and secured.

From the foregoing it is evident that a conveyor constructed with the belt support rollers supported only from the sidewalls or small transverse members will be much simpler of construction since there does not have to be provided any continuous internal floors to support such rollers.

As shown in FIG. 1, a preferred shape of the module or intermediate portion of the conveyor is that generally of a "pear" with the larger circular portion at the top and the narrower portion at the bottom of the housing 10. The purpose of this configuration is to help provide greater structural stability to the housing 10 as well as to provide steep angle sides in the lower portion from which any spilled material can be diverted to the lower side of the conveyor for easy clean-out. Each module is constructed in this way so as to have structural integrity, such that a multiplicity of modules can be joined together to span great distances on the order of 50 to 80 feet without external support. Such completely enclosed tubular construction has similarities with aircraft fuselage construction, but is entirely foreign heretofore to the conveyor field. The modules when attached to appropriate inlet and outlet sections form a complete enclosed conveyor and can be effectively sealed so as to support a negative pressure within the conveyor for dust control and all-weather operation.

Also important to the structural integrity of the module are the transverse beams 57 extending laterally of the tube length. The beams 57 hold the sides of the tube in position and thereby prevent lateral flexing or "flattening" of the tube shape as it is subjected to great strain over its entire length. Flanges 45 encircling the module also aid in maintaining the shape of the housing and the rigidity of the conveyor by preventing lateral flexing and deformation. Moreover, longitudinal members as shown in FIG. 4 in the form of a T-Bar at the top of the housing 10 internally thereof aid in providing long-span rigidity and freedom from undesirable longitudinal flexing. Brackets 38 may extend longitudinally along the length of housing 10 to aid in reducing deflection and sagging over greater spans.

The combination of these features results in a long-span, enclosed conveyor which is self supporting and is resistant to sagging and shape-deformation even under heavy loads. The conveyor can be made effectively air-tight for dust-control purposes, and can be constructed on site with end-to-end modules to span greater distances with fewer external supports than is possible using any known conveyor construction.

Although the invention has been described in conjunction with detachably connected modules, the benefits of ease of on-site construction will still be realized by welding sections together if more permanent joints are required.

While the invention has been described only with reference to a specific embodiment, it should be understood that certain changes in construction may be made by one skilled in the art and would not thereby depart from the spirit and scope of this invention which is limited only by the claims appended hereto.

I claim:

1. An enclosed conveyor module adapted to be connected with other modules in series, comprising in combination:
   a unitary tubular housing having a rounded upper longitudinal side and a planar longitudinal lower side which lower side is removable for purposes of cleaning out spilled materials;
   a first pair of longitudinal support members extending respectively along the two lateral edges of said planar longitudinal lower side to reduce deformation of said housing caused by compression;
   a second pair of longitudinal support members extending longitudinally along opposite lateral sides of the interior of said housing to reduce deformation of said housing;
   roller means attached to said second pair of longitudinal support members for supporting a conveyor belt;
   at least one longitudinal support member extending longitudinally along the upper side of said housing to reduce deformation of said housing;
   at least one transverse beam mounted within said housing and having mutually opposite ends of said beam attached respectively to the interior of said housing side walls so as to reduce deformation of said housing when under stress; and
   at least one circumferential flange means having opposite ends and encircling said housing so as to reduce deformation of said housing when under stress, said flange means being attached at the respective ends thereof to said first pair of longitudinal support members.

2. A conveyor module as set forth in claim 1, including inlet and outlet sections attached respectively to said open ends of said tubular housing, and having head and tail pulleys rotatably mounted respectively in said sections to accomodate a conveyor belt about said pulleys, and including means for moving a conveyor belt.

3. A conveyor module as set forth in claim 2, wherein said module and said inlet and outlet sections form a sealable enclosure.

4. A conveyor module as set forth in claim 1, wherein the shape of said tubular housing is essentially "pear" shaped in cross-section.

5. A conveyor module as set forth in claim 1, wherein at least one circumferential flange is attached to an open end of said housing and is adapted to attached said module end to another like module.

* * * * *